(12) United States Patent
Nelson et al.

(10) Patent No.: US 10,823,668 B2
(45) Date of Patent: Nov. 3, 2020

(54) APPARATUSES AND METHODS FOR ALKALI SPECTROSCOPY

(71) Applicant: Honeywell International Inc., Morris Plains, NJ (US)

(72) Inventors: Karl D. Nelson, Plymouth, MN (US); Matthew Wade Puckett, Scottsdale, AZ (US); Neil Krueger, Saint Paul, MN (US)

(73) Assignee: Honeywell International Inc., Charlotte, NC (US)

( * ) Notice: Subject to any disclaimer, the term of this patent is extended or adjusted under 35 U.S.C. 154(b) by 280 days.

(21) Appl. No.: 15/961,478

(22) Filed: Apr. 24, 2018

(65) Prior Publication Data
US 2019/0323952 A1 Oct. 24, 2019

(51) Int. Cl.
*G01N 21/31* (2006.01)
*G04F 5/14* (2006.01)

(52) U.S. Cl.
CPC ........... *G01N 21/3103* (2013.01); *G04F 5/14* (2013.01); *G01N 2021/3107* (2013.01)

(58) Field of Classification Search
CPC ........ G01N 2021/3107; G01N 21/3103; G04F 5/14
USPC ........................................................ 356/437
See application file for complete search history.

(56) References Cited

U.S. PATENT DOCUMENTS

| 7,127,146 | B2 | 10/2006 | Schmidt et al. | |
| 8,288,712 | B2 | 10/2012 | Bouyer et al. | |
| 8,385,693 | B2 | 2/2013 | Schmidt et al. | |
| 8,588,557 | B2 | 11/2013 | Schmidt et al. | |
| 2006/0147169 | A1* | 7/2006 | Sugita | B82Y 20/00 385/129 |
| 2008/0278710 | A1 | 11/2008 | Schmidt et al. | |
| 2014/0368110 | A1* | 12/2014 | Hirayama | H01J 37/32229 315/39 |
| 2016/0231352 | A1 | 8/2016 | Dell et al. | |
| 2016/0291549 | A1* | 10/2016 | Herbsommer | G01N 29/36 |

OTHER PUBLICATIONS

Giraud-Carrier et al, "Perforated Hollow-core Optical Waveguides for On-chip Atomic Spectroscopy and Gas Sensing", "Applied Physics Letters 108, 131105 (2016)", Dated Mar. 29, 2016, pp. 131105-1-131105-4, Publisher: AIP Publishing LLC.

(Continued)

*Primary Examiner* — Sunghee Y Gray
(74) *Attorney, Agent, or Firm* — Fogg & Powers LLC

(57) ABSTRACT

An apparatus is provided. The apparatus comprises a substrate; a low index of refraction region in or on the substrate; an optical waveguide; a cover; wherein at least a portion of the low index of refraction region and the optical waveguide are hermetically sealed under the cover; a chamber formed by the low index of refraction region and the cover; atoms; an environment, in the chamber, including the atoms and having a first index of refraction; a segment of the optical waveguide formed over the low index of refraction region and within the chamber; and wherein the segment has a second index of refraction which is substantially equal to the first index of refraction.

10 Claims, 8 Drawing Sheets

(56) References Cited

OTHER PUBLICATIONS

Giraud-Carrier, "Perforated Hollow Core Waveguides for Alkali Vapor-cells and Slow Light Devices", "Brigham Young University, BYU Scholars Archive", "All Theses and Dissertations.5692", Dated Feb. 1, 2016, pp. 1-131, Publisher: Matthieu C. Giraud-Carrier.
Ritter et al, "Atomic Vapor Spectroscopy in Integrated Photonic Structures", Dated May 5, 2015, pp. 1-5.
Spillane et al, "Observation of Nonlinear Optical Interactions of Ultralow Levels of Light in a Tapered Optical Nanofiber Embedded in a Hot Rubidium Vapor", "Physical Review Letters 100, 233602", Dated Jun. 13, 2008, pp. 233602-1-233602-4, Publisher: American Physical Society.
Stern et al, "Nanoscale Light-matter Interactions in Atomic Cladding Waveguides", "Nature Communications", Dated Mar. 5, 2013, pp. 1-7, Publisher: Macmillan Publishers Limited.
Wu et al, "Planar Hollow-Core Waveguide Technology for Atomic Spectroscopy and Quantum Interference in Alkali Vapors", "Journal of Lightwave Technology", Dated Dec. 1, 2008, pp. 3727-3733, vol. 26, No. 23, Publisher: IEEE.
Thorlabs, "Saturated Absorption Spectrscopy System", https://www.thorlabs.com/newgrouppage9.cfm?objectgroup_id=5616, date downloaded: Mar. 9, 2018, pp. 1-2.
European Patent Office, "Extended European Search Report from EP Application No. 19157602.4", from Foreign Counterpart to U.S. Appl. No. 15/961,478, dated Oct. 14, 2019, pp. 1-10, Published: EP.
Giraud-Carrier et al., "Perforated Hollow-Core Waveguide Devices for Atomic Spectroscopy with Alkali Vapor", Optical Society of America, 2016, pp. 1-2.

\* cited by examiner

APPARATUSES AND METHODS FOR ALKALI SPECTROSCOPY

STATEMENT REGARDING FEDERALLY SPONSORED RESEARCH OR DEVELOPMENT

This invention was made with Government support under Government Contract # HR0011-16-C-0122 awarded by DARPA CMO. The Government has certain rights in the invention.

BACKGROUND

Atomic clocks use saturated absorption spectroscopy systems to generate frequency locked (or stabilized) optical signals for use as a frequency reference. Due to the demand for miniaturization of atomic clocks, there is a desire for integrated spectroscopy systems.

Saturated absorption spectroscopy systems utilize an alkali cell, also known as an alkali vapor cell. Hollow core planar optical waveguides have been proposed to implement an integrated alkali cell. U.S. Pat. No. 7,127,146 illustrates an exemplary hollow core planar optical waveguide, and is hereby incorporated by reference in its entirety.

However, the optical loss of hollow core planar waveguide diminishes signal to noise ratio of a signal generated with the alkali cell and used to create the frequency locked optical signal. As a result, the frequency locked optical signal has undesirably higher frequency noise. When the frequency locked optical signal is used as a reference in an atomic clock, the increased frequency noise diminishes the accuracy of the atomic clock. Therefore, there is a need for an integrated alkali cell that has lower loss.

SUMMARY

An apparatus is provided. The apparatus comprises a substrate; a low index of refraction region in or on the substrate; an optical waveguide; a cover; wherein at least a portion of the low index of refraction region and the optical waveguide are hermetically sealed under the cover; a chamber formed by the low index of refraction region and the cover; atoms; an environment, in the chamber, including the atoms and having a first index of refraction; a segment of the optical waveguide formed over the low index of refraction region and within the chamber; and wherein the segment has a second index of refraction which is substantially equal to the first index of refraction.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
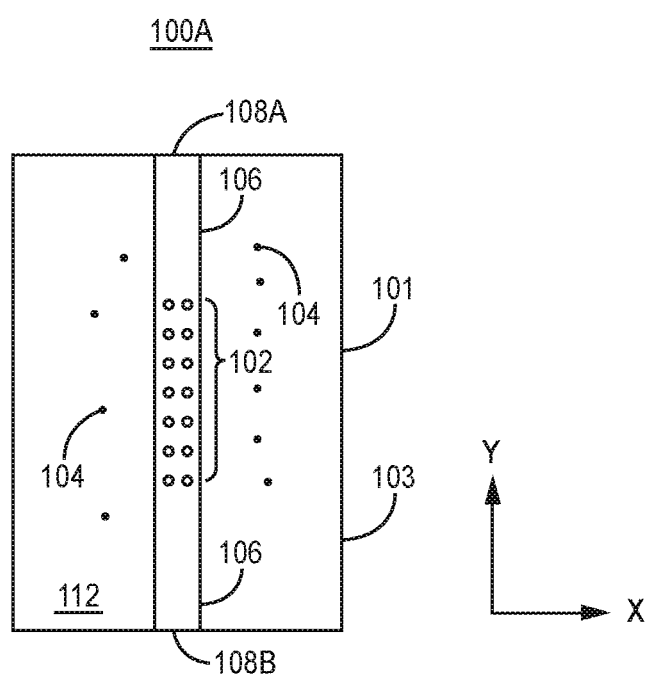
FIG. 1A illustrates a plan view of one embodiment of an alkali cell implemented with a porous, unclad waveguide.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

An alkali cell implemented with a porous, unclad waveguide may be used to overcome the above referenced problem. Embodiments of the porous, unclad waveguide have at least one advantage. The porous, unclad waveguide has lower loss than the hollow core planar waveguide. The porous, unclad waveguide is less lossy because the optical signal is not confined within the porous, unclad waveguide, and thus is not susceptible to sidewall losses that occur in the hollow core planar waveguide.

The porous, unclad waveguide is formed over a region configured to have a low index of refraction such as a trench or porous dielectric. Low index of refraction region means a region configured to have a low index of refraction, e.g. in or infiltrated by an environment having an index of refraction substantially equal to 1. For example, such an environment is a low pressure environment. One example of a low pressure environment is a vacuum, e.g. a vacuum or near vacuum. The region configured to have a low index of refraction region permits a desired optical mode to propagate through the porous, unclad waveguide. The trench or porous dielectric, and a cover (or an equivalent as illustrated below) enclose alkali atoms in the low pressure environment. As a result, the porous unclad waveguide (and the porous dielectric if used) have a low index of refraction. Low index of refraction means an index of refraction substantially equal (or about) 1, e.g. 1.08, between 1.00001 and 1.2, or between 1.01 and 1.1.

FIG. 1A illustrates a plan view of one embodiment of an alkali cell implemented with a porous, unclad waveguide (improved alkali cell) 100A. The improved alkali cell 100A implemented with a chamber 101 enclosing a porous, unclad waveguide 102 surrounded by alkali atoms 104 in a vapor phase in a low index of refraction environment 112. Although, the holes in the porous, unclad waveguide 102 in FIGS. 1A-1C and 4 appear periodic, in alternative embodiment the holes can be more randomly distributed. For example, the alkali 104 in the chamber 101 may be rubidium or cesium. The chamber 101 is at least partially formed in a substrate 103.

The porous, unclad waveguide 102 is an optical waveguide. The porosity may be within a range, e.g. sixty five to ninety five percent, eighty five to ninety percent, or another range. The porous, unclad waveguide 102 has an optical first port 108A at a first end of the porous, unclad waveguide 102, and an optical second port 108B at a second end of the porous, unclad waveguide 102. Optionally, the porous, unclad waveguide 102 is unbent, and the first port 108A and the second port 108B are linearly opposite one another. Optionally, as illustrated in FIG. 1A, other waveguide 106, e.g. cladded or partially cladded, or ribbed, optical waveguide can serve as an interface between the optical first port 108A and/or the optical second port 108B and respective ends of the porous, unclad waveguide 102.

Thus, the other waveguide 106 and the porous, unclad waveguide 102 form an optical waveguide. The porous, unclad waveguide 102 is a segment of the optical waveguide. The segment of the optical waveguide is formed over the low index of refraction region and within the chamber 101. The segment of the optical waveguide has a second index of refraction which is substantially equal to the first index of refraction of the low index of refraction environment 112 that includes atoms, e.g. alkali atoms 104.

The length of the porous, unclad waveguide 102 may fall within a range, e.g. three to seven millimeters or another range. For example, the length of the porous, unclad waveguide 102 may be about five millimeters. The length of the other waveguide 106 may fall within a range, e.g. one to three millimeters. For example, the length of the other waveguide 106 may be about two millimeters. The length of the subsequently described trench 109 would typically be at least as long as the length of the porous, unclad waveguide 102. The length of the improved alkali cell 100A may vary, e.g. such as one centimeter.

The porous, unclad waveguide 102 as used herein means a porous material, e.g. a dielectric. When the porous, unclad waveguide 102 is in or adjacent to a low index of refraction environment 112, the porous, unclad waveguide 102 has a low index of refraction. A low index of refraction of environment 112 means a region absent solid matter, e.g. a vacuum including alkali atoms, which has a low index of refraction.

In a low index of refraction environment 112, the porous, unclad waveguide 102 only weakly confines an optical signal, e.g. light; the optical signal exists mostly outside of and around the porous, unclad waveguide 102. Optionally, the porous, unclad waveguide 102 may be porous silicon dioxide and/or porous silicon nitride. Alternatively, the porous, unclad waveguide 102 can be formed on a region having an index of refraction lower than the waveguide, e.g. porous material for example porous silicon or porous silicon dioxide.

Figure 1B:
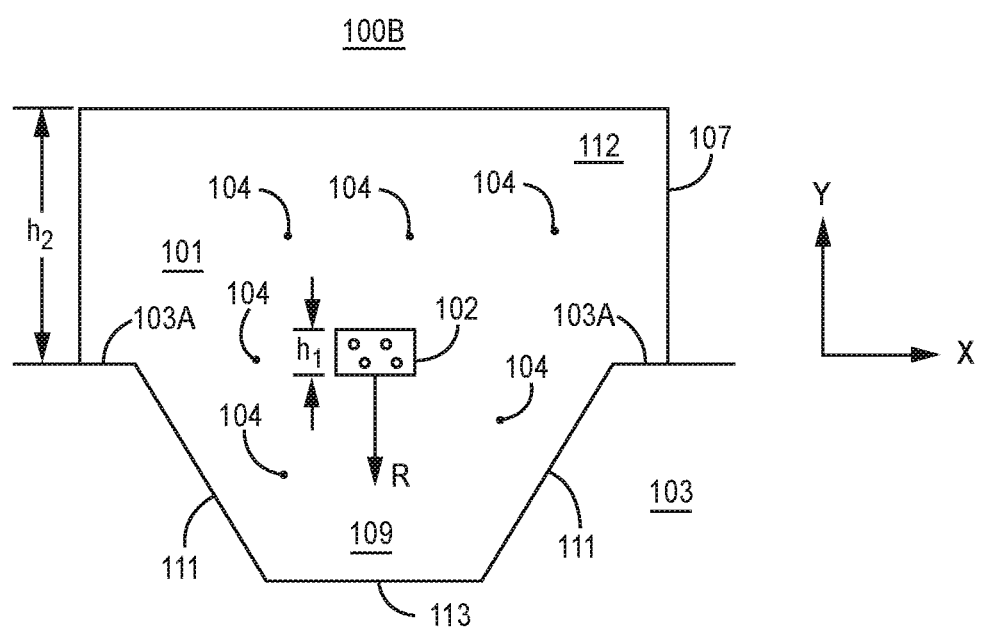
FIG. 1B illustrates a cross sectional view of one embodiment of an alkali cell implemented with a porous, unclad waveguide.

As will be shown below, embodiments of the invention include an optical waveguide having a low index of refraction formed over a region of low index of refraction, e.g. a trench or porous dielectric. FIG. 1B illustrates a cross sectional view of one embodiment of an alkali cell implemented with a porous, unclad waveguide (improved alkali cell) 100B. The chamber 101 is formed by a cover 107 over a low index of refraction region, e.g. a trench 109 in the substrate 103. The cover 107 is hermetically sealed to the substrate 103, or another material layer as will be subsequently described. Optionally the substrate 103 is a silicon substrate. Optionally, the cover 107, e.g. having five sides, is made of borosilicate glass. Optionally, the trench sidewalls 111 and the trench bottom 113 can be flat surfaces; alternatively, as will later be discussed, the trench sidewalls 111 and the trench bottom 113 can have curved surfaces.

The porous, unclad waveguide 102 is positioned in, e.g. substantially centered in, the illustrated cross-section of the chamber 101. There is a minimum radial separation, R, between (a) any surface of the chamber 101 (e.g. of the trench sidewall 111, trench bottom 113, wall of the cover 107 of the chamber 101, wall of other material 115, and/or any other wall of the chamber 101) in a plane (formed by the illustrated x- and y-axes) of the cross section of the improved alkali cell 100B, and (b) the surface of the porous, unclad waveguide 102 closest to the corresponding surface of the chamber 101. The plane is perpendicular to the axial direction (orthogonal to the x and y axes) of the porous, unclad waveguide 102.

The minimum radial separation, R, is determined based upon a desired frequency resolution of a spectroscopic signal returned from an optical source coupled to the improved alkali cell. The frequency resolution is determined by the time atoms of alkali can travel through an evanescent optical field (outside of the porous, unclad waveguide). For example, a desired frequency resolution is less than twenty megahertz, e.g. one megahertz. For the example of a one megahertz resolution, the alkali atoms would have to remain within the evanescent field for at least one microsecond to provide the evanescent fields an opportunity to excite electrons of the alkali atom to a higher energy level. As a result, the walls, of the chamber 101 in which there are atoms of the alkali, must be separated by five microns from the closest surface of the porous, unclad waveguide. For example, when the porous, unclad waveguide 102 lies on a plane that is coincident with the top surface 103 of the substrate 103, the height ($h_2$) of the sidewall of the cover 107 is equal to the height ($h_1$) of the porous, unclad waveguide 102 plus five microns so that a one Megahertz frequency resolution can be attained.

Figure 1C:
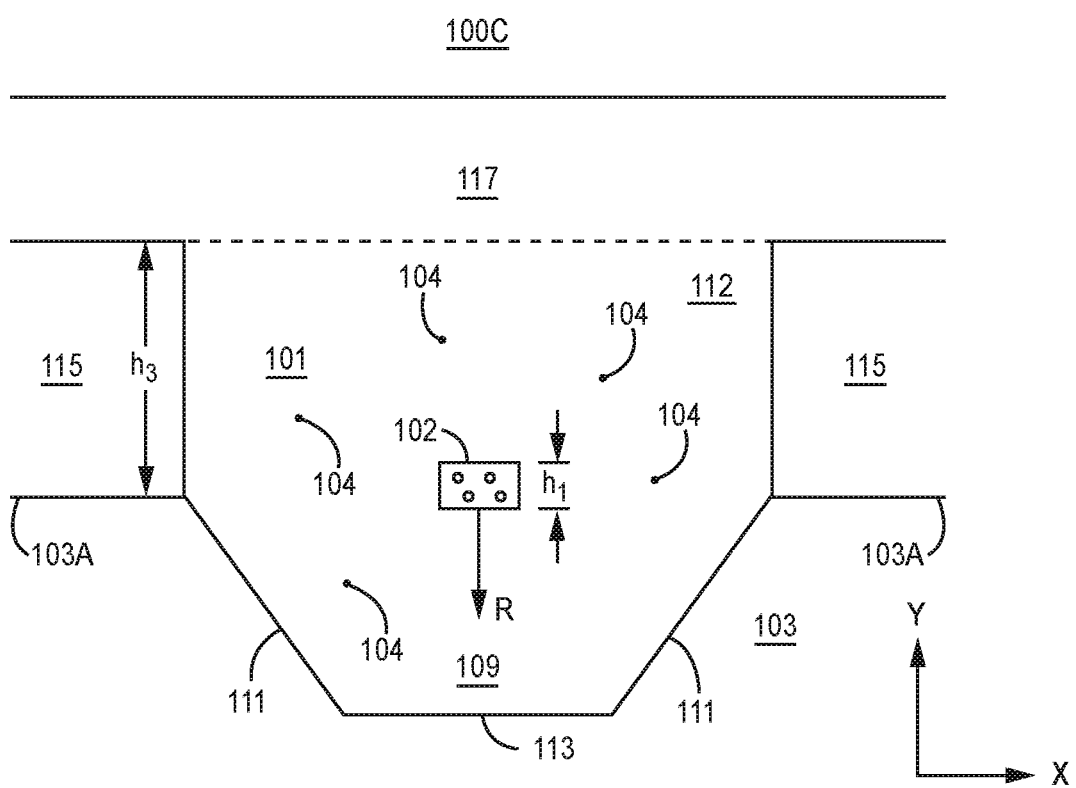
FIG. 1C illustrates a cross sectional view of another embodiment of an alkali cell implemented with a porous, unclad waveguide.

FIG. 1C illustrates a cross sectional view of another embodiment of an alkali cell implemented with a porous, unclad waveguide 100C. The illustrated chamber 101 is similar to the embodiment illustrated in FIG. 1B except that another embodiment of a cover, comprising a second substrate 117 on additional material 115, encloses the porous, unclad waveguide 102 and the low index of refraction region, e.g. the illustrated trench 109 in the substrate 103. The additional material 115 is formed over the top surface (or unetched surface) 103A of the substrate 103 except in the trench 109. Optionally the second substrate 117 is silicon. Optionally, additional material 115 is a dielectric such as silicon dioxide. For example, the height ($h_3$) of the sidewall of the other material layer 115 is equal to the height ($h_1$) of the porous, unclad waveguide 102 plus five microns so that a one Megahertz frequency resolution can be obtained.

Figure 1D:
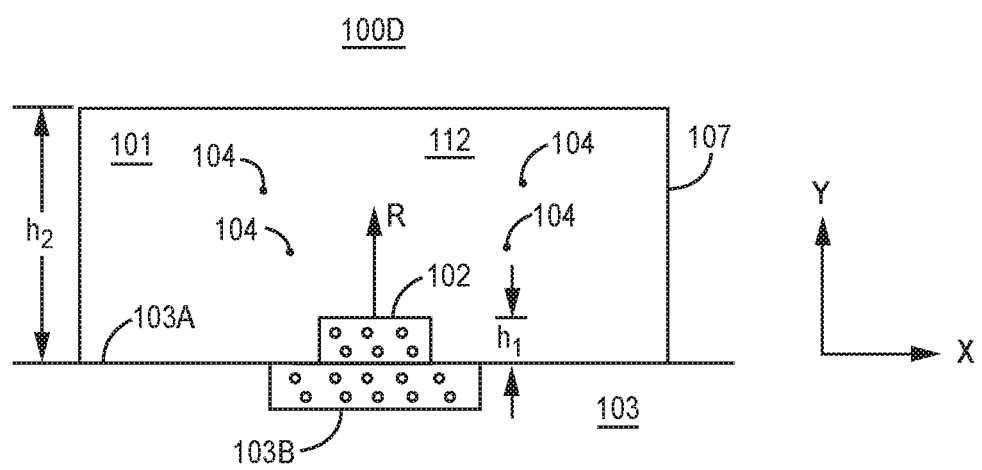
FIG. 1D illustrates a cross sectional view of a further embodiment of an alkali cell implemented with a porous, unclad waveguide.

Although a trench has been described above, the illustrated trench is not required for the invention but may be used in only certain embodiments of the invention. FIG. 1D illustrates a cross sectional view of a further embodiment of an alkali cell implemented with a porous, unclad waveguide (improved alkali cell) 100D. The illustrated improved alkali cell 100D is implemented without a trench. The porous, unclad waveguide 102 is formed on a portion of porous dielectric 103B, e.g. such as porous, silicon dioxide, which has a low index of refraction, e.g. of 1.08, lower than the index of refraction of the unclad waveguide 102. The portion of porous dielectric 103B may be formed in or on the substrate 103. FIG. 1D illustrates the portion of porous dielectric 103B formed on the substrate 103. Further, FIG.

1D illustrates use of a cover 107; however, the other material 115 and the second substrate 117 may be used in the alternative.

Figure 2A:
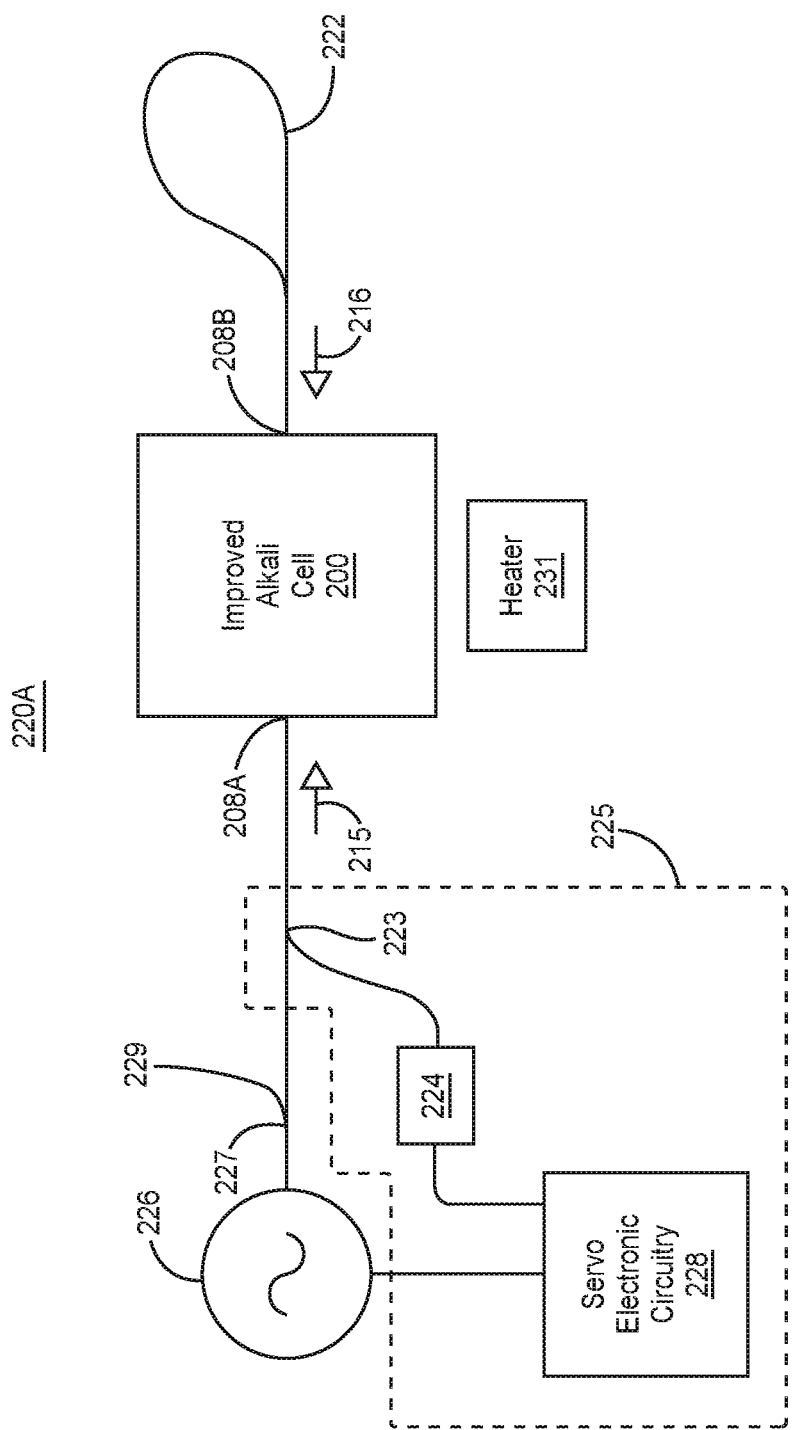
FIG. 2A illustrates a block diagram of one embodiment of a saturated absorption spectroscopy system using an alkali cell implemented with a porous, unclad waveguide.

FIG. 2A illustrates a block diagram of one embodiment of a saturated absorption spectroscopy system using an alkali cell implemented with a porous, unclad waveguide (improved saturated absorption spectroscopy system) 220A. The improved saturated absorption spectroscopy system 220A comprises an improved alkali cell 200 having a second port 208B terminated by an optical loop mirror 222, and an input coupled to a first port of a first optical combiner 223. The optical loop mirror 222 is an optical combiner, e.g. an optical coupler, having a single port; a portion an optical signal input into the single port is output at the single port.

An optical pump signal 215 is injected into the first port 208A of the improved alkali cell 200. An optical probe signal 216 is injected into the second port 208B of the improved alkali cell 200. The optical probe signal 216 is a fraction of the power level of the power level of the optical pump signal 215 incident on the single port of the optical loop mirror 222. The optical pump signal 215 has a power level that is larger, e.g. by a factor between ten to one hundred times, than the power level of the optical probe signal 216.

The first optical combiner 223 has three ports. A second port of the optical combiner is coupled to an optical source 226, e.g. a distributed feedback laser, a distributed Bragg reflector laser, or another type of laser. The third port of the optical combiner is coupled to an optical detector 224 such as a photodiode. The first optical combiner 223 may be an optical coupler. A portion of the optical probe signal 216 being emitted from the first port 208A (towards the optical source 226) is coupled to the optical detector 224. The optical detector 224 converts the portion of the optical probe signal 216 into an electrical signal which is indicative of the power level of the portion of the optical probe signal 216. The optical detector 224, and hence the electrical signal that it generates, are coupled to servo electronic circuitry 228. The servo electronic circuitry 228 may comprise a modulator and a lock-in detector. The servo electronic circuitry 228 generates a control signal used to tune the frequency of the optical signal output of the optical source to a peak in a spectroscopic signal. The servo electronic circuit 228 and the control signal are coupled to the optical source 226. The optical combiner 223, optical detector 224, and the servo electronic circuitry 228 form a feedback loop 225 used to frequency lock the optical source 226 to a frequency corresponding to the frequency at which electrons, of alkali atoms in the improve alkali cell 200, are excited to a higher energy level state. Thus, the feedback loop generates a frequency-locked optical pump signal.

Optionally, a first port and a second port of a second optical combiner 227, e.g. an optical coupler, is respectively inserted between the optical source 226 and the first optical combiner 223. A portion 229 of the frequency locked optical pump signal is provided by a third port of the second optical combiner 227, e.g. to another portion of an atomic clock. For purposes of clarity, however, the improved saturated absorption spectroscopy system illustrated herein can be used in other applications.

Optionally, the improved saturated absorption spectroscopy system 220A includes a heater 231, e.g. utilizing resistive or Joule heating. The heater 231 can be used to increase the temperature, and thus increase the vapor pressure of the alkali. This increases the amount of alkali atoms in a vapor in the improved alkali cell 200, increases the signal to noise ratio of the electric signal generated by the optical detector 224, and thus improves the ability to frequency lock the optical source 226 as is subsequently described. Optionally, the improved alkali cell 200, the first optical combiner 223, the optical loop mirror 222, the second optical combiner 227, the optical detector 224, the optical source 226, the servo electronic circuitry 228, and/or the heater 231 can be integrated together on a single substrate.

Figure 2B:
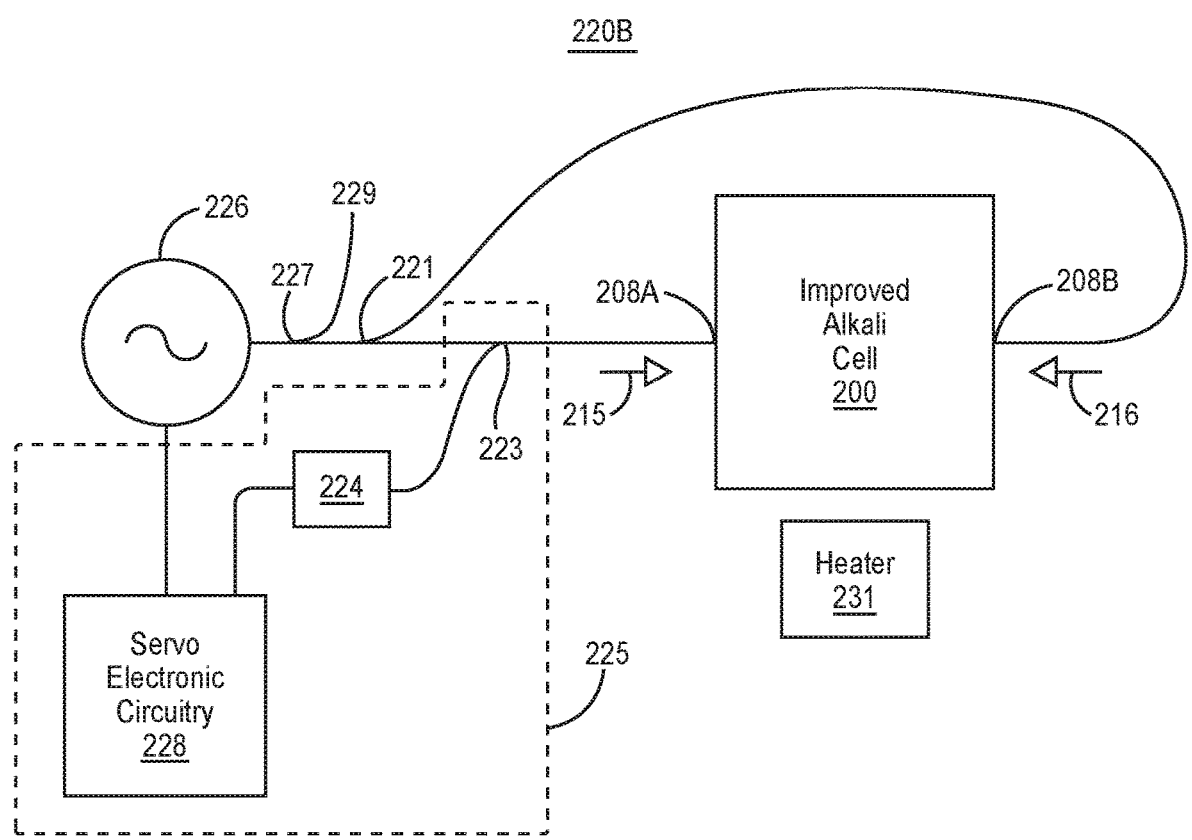
FIG. 2B illustrates a block diagram of another embodiment of a saturated absorption spectroscopy system using an alkali cell implemented with a porous, unclad waveguide.

FIG. 2B illustrates a block diagram of another embodiment of a saturated absorption spectroscopy system using an alkali cell implemented with a porous, unclad waveguide (improved saturated absorption spectroscopy system) 220B. The improved saturated absorption spectroscopy system 220B is similar to the embodiment illustrated in FIG. 2A, except that instead of using an optical mirror loop 222, a third optical combiner 221, e.g. an optical coupler, is used. The third optical combiner 221 is inserted between the optical source 226 and the first optical combiner 223. The third optical combiner 221 may be an optical coupler, and couples a portion of the optical signal from the optical source 226 to the second port 208B; the coupled portion of the optical signal is the optical probe signal 216. Optionally, the improved alkali cell 200, the first optical combiner 223, the optical loop mirror 222, the second optical combiner 227, the optical detector 224, the optical source 226, the third optical combiner 221, the servo electronic circuitry 228 and/or the heater 231 can be integrated together on a single substrate.

Figure 3:
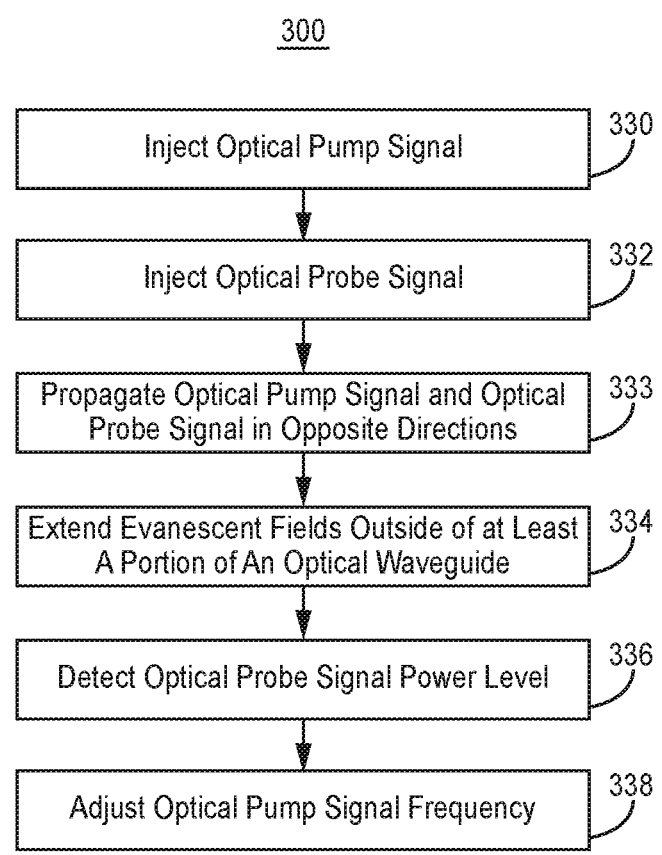
FIG. 3 illustrates an exemplary method of operation of an improved saturated absorption spectroscopy system.

FIG. 3 illustrates an exemplary method of operation of an improved saturated absorption spectroscopy system 300. To the extent the method 300 shown in FIG. 3 is described herein as being implemented in the devices shown in FIGS. 1A through 2B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 330, inject, into a first port of an optical waveguide, an optical pump signal having a frequency approximately the frequency required to excite electrons, of an alkali atom, to a higher energy state. There may be more than one such frequency because there may be more than one higher energy state. The system designer selects the frequency corresponding to the desired energy state. Optionally, prior to injecting any optical signal, heat alkali atoms.

In block 332, inject, into a second port of the optical waveguide, an optical probe signal having the frequency approximately the frequency required to excite electrons, of an alkali atom, to a higher energy state, where a power level of the optical probe signal is less than the power level of the optical pump signal.

In block 333, propagate the pump signal and the probe signal in opposite directions along at least a portion of the optical waveguide. Optionally, at least a portion of the optical waveguide is an unclad, porous waveguide in a chamber including alkali atoms in a low pressure, e.g. a vacuum, vapor state. In block 334, extend evanescent fields of at least one of the optical pump signal and the optical probe signal outside of the at least a portion of the optical waveguide, so that evanescent fields interact with the alkali atoms.

In block 336, detect the power level of the optical probe signal emanating from the first port of the optical waveguide. In block 338, adjust the frequency of the optical pump signal, based upon the detected optical probe signal power level, so that the frequency is equal to a frequency resulting in the optical pump signal exciting, to a higher energy level, electrons, of at least one alkali atom moving in a direction that is orthogonal to the axis along which the optical pump signal and the optical probe signal propagate through the at least a portion of the optical waveguide. In one embodiment, the frequency of the optical pump signal is adjusted to a frequency where the optical probe signal power level is maximum.

Figure 4:
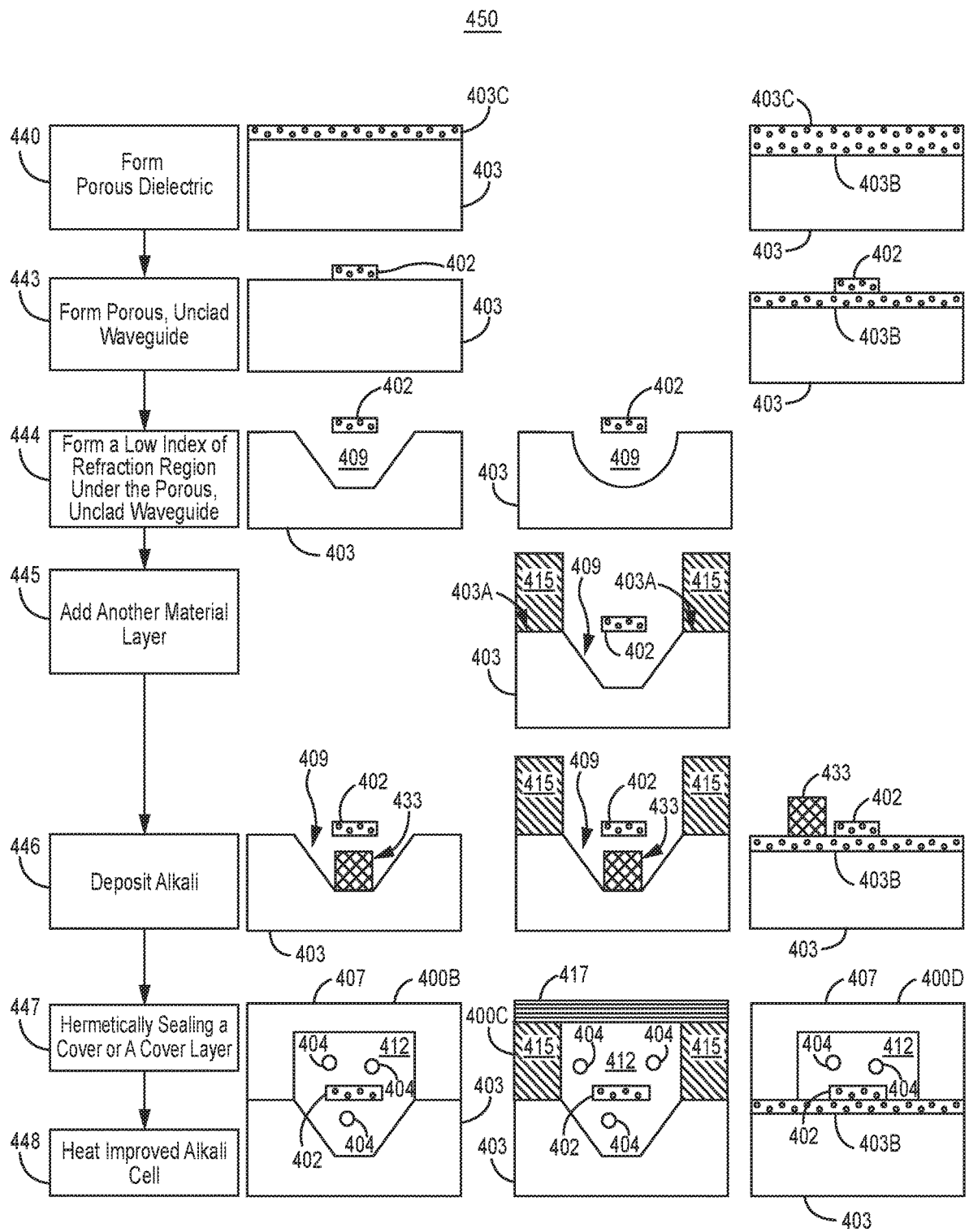
FIG. 4 illustrates an exemplary method of making an alkali cell implemented with a porous, unclad waveguide.

FIG. 4 illustrates an exemplary method of making an alkali cell implemented with a porous, unclad waveguide (improved alkali cell) 450. To the extent the method shown in FIG. 4 is described herein as being implemented in the devices shown in FIGS. 1A through 1C, it is to be understood that other embodiments can be implemented in other ways. The cross sectional diagrams in FIG. 4 are examples only, and it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, form a porous dielectric 403C. Optionally, the porous dielectric 403C may be thicker, e.g. twice as thick, if a porous, unclad waveguide 402 is formed over a layer of porous dielectric 403B. In one embodiment, a substrate 403 is silicon. In one embodiment, form the porous dielectric 403C in the substrate 403 as follows. Etch a portion of the top layer of the substrate 403, e.g. via electrochemical etching, to make porous material. Then make the porous material into porous dielectric 403C, e.g. by oxidation. For example, make the porous silicon into porous silicon dioxide by oxidizing, e.g. thermally oxidizing, the porous silicon.

In block 443, form a waveguide on the substrate 403. At least part of the waveguide is a porous, unclad waveguide 402 on the substrate 403; the other part(s) of the waveguide may be another type of planar, optical waveguide, e.g. cladded or rib waveguide as described above for the other waveguide 106. For example, pattern a mask, e.g. a metal mask, over the substrate 403, the second porous dielectric 403C, e.g. porous silicon dioxide, and possibly any other material that would be formed into the other waveguide 106. In one embodiment, the mask is patterned using conventional deep ultraviolet, electron beam, or X-ray lithography techniques utilizing resist, such as photoresist. Then, etch the substrate, the second porous dielectric 403C, and possibly the any other material not under the mask. Subsequently, remove the mask by etching. Optionally, the layer of porous dielectric 403B remains under the porous, unclad waveguide 402. The layer of porous dielectric 403B or the subsequently described trenches form a low index of refraction region.

Optionally (e.g. if block 440 was not performed), in block 444, form a trench 409 under the porous, unclad waveguide 402 by etching the portion of the substrate 403 proximate to, e.g. within five or microns of, the porous, unclad waveguide 402. For example, pattern a portion of the substrate 403 to be etched by using conventional deep ultraviolet, electron beam, or X-ray lithography techniques utilizing resist, such as photoresist; etch (using a isotropic dry etch which may form a trench 409 with a curved cross section or an anisotropic wet etch which may form a trench 409 with a trapezoidal cross section) the substrate with a means, e.g. a chemical, that substantially only etches the patterned portion of the substrate 403 and not the porous, unclad waveguide 402.

Optionally, in block 445, add another material layer 415, e.g. silicon dioxide or silicon nitride, over (or on the top (or unetched) surface(s) 403A) of the substrate 403. For example, mask the trench 409 with a patterned resist (if a trench 409 has been formed), form another material on the substrate of a desired height for example the depth of the trench (e.g. thermally oxidize a silicon substrate to grow the silicon dioxide), and remove the patterned resist (if a trench 409 has been formed). The masking, if used, may utilize conventional deep ultraviolet, electron beam, or X-ray lithography techniques utilizing resist, such as photoresist.

In block 446, deposit alkali 433 in, or on (e.g. partially or wholly on), the low index of refraction region, e.g. by adding at least one droplet of alkali 433 in a liquid phase, e.g. liquefied by heating the alkali 433. To liquefy the alkali 433, the alkali 433 in solid form may need to be heated, e.g. above 40 degrees C. such as for example at 60 degrees C. Optionally, if a trench 409 is used, deposit the alkali 433 in a corner or towards one side of the trench 409.

In block 447, hermetically sealing a cover or cover layer over the low index of refraction region, porous, unclad waveguide 402, a low index of refraction environment 412, and the alkali 433. The cover or cover layer is hermetically sealed when attached to the substrate. In one embodiment, attach a cover 407, e.g. made from borosilicate glass, to the top surface(s) 403A of the substrate 403. In another embodiment, attach a second substrate 417 (i.e. cover layer) to the other material layer 415 to cover the trench 409; the second substrate 417 may be attached by conventional wafer bonding techniques. Thus, the improved alkali cell 400B, 400C, 400D is formed.

Optionally, in block 448, providing heat, e.g. with the heater 231, to heat the improved alkali cell 400B, 400C, 400D, e.g. the alkali 433 so that the alkali 433 enters a vapor phase and that alkali atoms 404 move within the low index of refraction environment 412. In one embodiment, heat the improved alkali cell 400B, 400C, 400D to at least 40 degrees C. In another embodiment, heat the substrate 403 to heat the improved alkali cell 400B, 400C, 400D. Heating the improved alkali cell 400B, 400C, 400D increases the vapor pressure of the alkali. This increases the amount of alkali atoms 404 in a vapor in the improved alkali cell 200, increases the signal to noise ratio of the electric signal generated by the optical detector 224, and thus improves the ability to frequency lock the optical source 226.

Terms of relative position as used in this application are defined based on a plane parallel to the conventional plane or working surface of a device, layer, wafer, or substrate, regardless of orientation. The term "horizontal" or "lateral" as used in this application are defined as a plane parallel to the conventional plane or working surface of a device, layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a device, layer, wafer, or substrate, regardless of orientation. The term "coplanar" as used in this application is defined as a plane in the same plane as the conventional plane or working surface of a device, layer, wafer, or substrate, regardless of orientation.

EXAMPLE EMBODIMENTS

Example 1 includes an apparatus, comprising: a substrate; a low index of refraction region in or on the substrate; an optical waveguide; a cover; wherein at least a portion of the low index of refraction region and the optical waveguide are hermetically sealed under the cover; a chamber formed by the low index of refraction region and the cover; atoms; an environment, in the chamber, including the atoms and having a first index of refraction; a segment of the optical waveguide formed over the low index of refraction region and within the chamber; and wherein the segment has a second index of refraction which is substantially equal to the first index of refraction.

Example 2 includes the apparatus of Example 1, wherein a minimal radial distance between each any surfaces of the chamber that are perpendicular to the axial direction of the optical waveguide, and corresponding closest surfaces of the optical waveguide determines a frequency resolution of spectroscopy performed using an optical source configured to be coupled to the optical waveguide.

Example 3 includes the apparatus of any of Examples 1-2, wherein the atoms are alkali atoms.

Example 4 includes the apparatus of any of Examples 1-3, wherein the substrate comprises silicon and the optical waveguide comprise silicon dioxide.

Example 5 includes the apparatus of any of Examples 1-4, wherein segment comprises a porous dielectric.

Example 6 includes the apparatus of Example 5, wherein the porous dielectric is porous silicon dioxide.

Example 7 includes the apparatus of any of Examples 1-6, wherein the cover comprises another material formed on the substrate, and a second cover hermetically attached to the other material.

Example 8 includes the apparatus of any of Examples 1-7, further comprising a heater.

Example 9 includes the apparatus of any of Examples 1-8, wherein the low index of refraction region comprises a trench in the substrate or a porous dielectric in the substrate.

Example 10 includes the apparatus of any of Examples 1-9, wherein the optical waveguide has a first port and a second port; and further comprising: a first optical combiner having a first port, a second port, and a third port; a second optical combiner having a first port, a second port, and a third port; a third optical combiner having a first port, a second port, and a third port; a photodetector having an optical input and an electrical output; an optical source coupled to the first port of the second optical combiner; wherein the first port of the optical waveguide is coupled to the second port of the first optical combiner; wherein the second port of the optical waveguide is coupled to the third port of the third optical combiner; wherein the second port of the second optical combiner is coupled to the first port of the third optical combiner; wherein the second port of the third optical combiner is coupled to the first port of the first optical combiner; wherein the third port of the first optical combiner is coupled to the optical input of the photodetector; servo electronic circuitry coupled to the optical source and the electrical output of the photodetector; wherein a feedback loop comprises the photodetector, servo electric circuitry, and the first combiner; wherein the feedback loop is configured to cause an optical signal generated by the optical source to lock to frequency at which electrons, of the atoms, are excited to a higher energy level state; and wherein the third port of the second optical combiner is configured to provide frequency stabilized optical signal.

Example 11 includes the apparatus of any of Examples 1-9, wherein the optical waveguide has a first port and a second port; and further comprising: a first optical combiner having a first port, a second port, and a third port; a second optical combiner having a first port, a second port, and a third port; a photodetector having an optical input and an electrical output; an optical source coupled to the first port of the second optical combiner; an optical mirror coupled to the second port of the optical waveguide; wherein the first port of the optical waveguide is coupled to the second port of the first optical combiner; wherein the second port of the second optical combiner is coupled to a first port of the first optical combiner; wherein the third port of the first optical combiner is coupled to the optical input of the photodetector; servo electronic circuitry coupled to the optical source and the electrical output of the photodetector; wherein a feedback loop comprises the photodetector, servo electric circuitry, and the first combiner; wherein the feedback loop is configured to cause an optical signal generated by the optical source to lock to frequency at which electrons, of the atoms, are excited to a higher energy level state; and wherein the third port of the second optical combiner is configured to provide frequency stabilized optical signal.

Example 12 includes a method, comprising: injecting, into a first port of an optical waveguide, an optical pump signal having a frequency approximately the frequency of required to excite electrons, of an alkali atom, to a higher energy state; injecting, into a second port of the optical waveguide, an optical probe signal having the frequency approximately the frequency of required to excite electrons, of an alkali atom, to a higher energy state, where a power level of the optical probe signal is less than the power level of the optical pump signal; propagating the pump signal and the probe signal in opposite directions along at least a portion of the optical waveguide; extending evanescent fields of at least one of the optical pump signal and the optical probe signal outside of the at least a portion of the optical waveguide, so that evanescent fields interact with alkali atoms for a sufficient amount of time to obtain a frequency resolution of spectroscopy of twenty megahertz or less; detecting the power level of the optical probe signal emanating from the second port from the optical waveguide; and adjusting the frequency of the optical pump signal, based upon the detected optical probe signal power level, so that the frequency is equal to a frequency resulting in the optical pump signal exciting, to a higher energy level, electrons, of at least one alkali atom moving in a direction that is orthogonal to the axis along which the optical pump signal and the optical probe signal propagate through the optical waveguide.

Example 13 includes the method of Example 12, further comprising injecting, into a second port of the optical waveguide, an optical probe signal having the frequency approximately the frequency of required to excite electrons, of an alkali atom, to a higher energy state, where a power level of the optical probe signal is less than the power level of the optical pump signal comprises injecting, into the second port of the optical waveguide, the optical probe signal, where the power level of the optical probe signal is less than the power level of the optical pump signal by a factor between ten to one hundred times.

Example 14 includes the method of any of Examples 12-13, wherein adjusting the frequency of the optical pump signal comprises adjusting the frequency of the optical pump signal to a frequency where the optical probe signal power level is maximum.

Example 15 includes the method of any of Examples 12-14, wherein adjusting the frequency of the optical pump signal comprises adjusting the frequency of the optical pump signal, where the frequency has a resolution determined by a minimal radial distance between any surfaces of a chamber, containing the at least a portion of the optical waveguide and the alkali atoms, that are perpendicular to the axial direction of the optical waveguide, and corresponding closest surfaces of the at least a portion of the optical waveguide.

Example 16 includes a method, comprising forming a porous dielectric on a substrate; forming a porous, unclad waveguide; forming a low index of refraction region under the porous, unclad waveguide; depositing alkali; and hermetically sealing a cover or cover layer over the low index of refraction region, the porous, unclad waveguide, an environment having a low index of refraction, and the alkali.

Example 17 includes the method of Example 16, further comprising adding another material layer over the substrate.

Example 18 includes the method of any of Examples 16-17, further comprising providing heat to the alkali so that the alkali enters a vapor phase and alkali atoms move within the low index of refraction environment.

Example 19 includes the method of any of Examples 16-18, wherein forming the porous material on the substrate comprises forming porous silicon dioxide on a substrate of silicon.

Example 20 includes the method of any of Examples 16-19, wherein depositing the alkali comprises depositing rubidium.

A number of examples defined by the following claims have been described. Nevertheless, it will be understood that various modifications to the described examples may be made without departing from the spirit and scope of the claimed invention. Therefore, it is manifestly intended that this invention be limited only by the claims and the equivalents thereof

What is claimed is:
1. An apparatus, comprising:
   a substrate;
   a low index of refraction region in or on a substrate, where the low index of refraction region has an index of refraction greater than or equal to 1.00001 and less than 1.2;
   an optical waveguide;
   a cover;
   wherein at least a portion of the low index of refraction region and the optical waveguide are hermetically sealed under the cover;
   a chamber formed by the low index of refraction region and the cover;
   atoms;
   an environment, in the chamber, including the atoms in a vacuum; and
   a segment of the optical waveguide surrounded only by the low index of refraction region, the vacuum, and the atoms in the vacuum, where the segment has an index of refraction that is greater than 1.00001 and less than or equal to 1.2, and where the index of refraction of the low index of refraction region is less than the index of refraction of the segment.
2. The apparatus of claim 1, wherein the atoms are alkali atoms.
3. The apparatus of claim 1, wherein the substrate comprises silicon and the optical waveguide comprise silicon dioxide.
4. The apparatus of claim 1, wherein the segment comprises a porous dielectric.
5. The apparatus of claim 4, wherein the porous dielectric is porous silicon dioxide.
6. The apparatus of claim 1, wherein the cover comprises another material formed on the substrate, and a cover layer hermetically attached to the another material.
7. The apparatus of claim 1, further comprising a heater.
8. The apparatus of claim 1, wherein the low index of refraction region comprises a trench in the substrate or a porous dielectric in the substrate.
9. The apparatus of claim 1, wherein the optical waveguide has a first port and a second port; and
   further comprising:
      a first optical combiner having a first port, a second port, and a third port;
      a second optical combiner having a first port, a second port, and a third port;
      a third optical combiner having a first port, a second port, and a third port;
      a photodetector having an optical input and an electrical output;
      an optical source coupled to the first port of the second optical combiner;
      wherein the first port of the optical waveguide is coupled to the second port of the first optical combiner;
      wherein the second port of the optical waveguide is coupled to the third port of the third optical combiner;
      wherein the second port of the second optical combiner is coupled to the first port of the third optical combiner;
      wherein the second port of the third optical combiner is coupled to the first port of the first optical combiner;
      wherein the third port of the first optical combiner is coupled to the optical input of the photodetector;
      servo electronic circuitry coupled to the optical source and the electrical output of the photodetector;
      wherein a feedback loop comprises the photodetector, servo electric circuitry, and the first combiner;
      wherein the feedback loop is configured to cause an optical signal generated by the optical source to lock to frequency at which electrons, of the atoms, are excited to a higher energy level state; and
      wherein the third port of the second optical combiner is configured to provide frequency stabilized optical signal.
10. The apparatus of claim 1, wherein the optical waveguide has a first port and a second port; and
   further comprising:
      a first optical combiner having a first port, a second port, and a third port;
      a second optical combiner having a first port, a second port, and a third port;
      a photodetector having an optical input and an electrical output;
      an optical source coupled to the first port of the second optical combiner;
      an optical mirror coupled to the second port of the optical waveguide;
      wherein the first port of the optical waveguide is coupled to the second port of the first optical combiner;

wherein the second port of the second optical combiner is coupled to a first port of the first optical combiner;

wherein the third port of the first optical combiner is coupled to the optical input of the photodetector;

servo electronic circuitry coupled to the optical source and the electrical output of the photodetector;

wherein a feedback loop comprises the photodetector, servo electric circuitry, and the first combiner;

wherein the feedback loop is configured to cause an optical signal generated by the optical source to lock to frequency at which electrons, of the atoms, are excited to a higher energy level state; and wherein the third port of the second optical combiner is configured to provide frequency stabilized optical signal.

* * * * *